United States Patent
Faure et al.

(10) Patent No.: US 11,142,487 B2
(45) Date of Patent: Oct. 12, 2021

(54) METHOD FOR OBTAINING A CARBONITRIDED ZIRCONIA-BASED ARTICLE

(71) Applicant: The Swatch Group Research and Development Ltd, Marin (CH)

(72) Inventors: Cedric Faure, Cortaillod (CH); Loic Curchod, Lausanne (CH)

(73) Assignee: The Swatch Group Research and Development Ltd, Marin (CH)

( * ) Notice: Subject to any disclaimer, the term of this patent is extended or adjusted under 35 U.S.C. 154(b) by 228 days.

(21) Appl. No.: 16/323,628

(22) PCT Filed: Jun. 16, 2017

(86) PCT No.: PCT/EP2017/064750
§ 371 (c)(1),
(2) Date: Feb. 6, 2019

(87) PCT Pub. No.: WO2018/036681
PCT Pub. Date: Mar. 1, 2018

(65) Prior Publication Data
US 2019/0202748 A1    Jul. 4, 2019

(30) Foreign Application Priority Data
Aug. 26, 2016    (EP) .................................. 16185920

(51) Int. Cl.
*C04B 41/50*    (2006.01)
*C04B 41/87*    (2006.01)
(Continued)

(52) U.S. Cl.
CPC ........ *C04B 41/5062* (2013.01); *C04B 41/009* (2013.01); *C04B 41/87* (2013.01);
(Continued)

(58) Field of Classification Search
CPC ... C04B 41/5062; C04B 41/009; C04B 41/87; C23C 8/30
See application file for complete search history.

(56) References Cited

U.S. PATENT DOCUMENTS 5,679,611 A    10/1997    Chatterjee et al.
6,355,202 B2*    3/2002    Verdon ............... A44C 27/001
                                                264/430

FOREIGN PATENT DOCUMENTS

CN    1193617 A    9/1988
CN    1234537 A    11/1999
(Continued)

OTHER PUBLICATIONS

International Search Report dated Jul. 27, 2017 in PCT/EP2017/064750 filed on Jun. 16, 2017.
(Continued)

*Primary Examiner* — Kelly M Gambetta
(74) *Attorney, Agent, or Firm* — Oblon, McClelland, Maier & Neustadt, L.L.P.

(57) ABSTRACT

The present invention concerns a method for obtaining a finished or semi-finished zirconia-based article (1), the article having a metallic external appearance and non-zero surface electrical conductivity, characterized in that the method includes the steps consisting in:
taking at least one zirconia article, pre-shaped in its finished or semi-finished form;
placing said article inside a chamber (10) in which a gaseous mixture is arranged, this gaseous mixture including at least a first hydrogen and carbon based gas compound in a first concentration (C1) and a second hydrogen and nitrogen based gas compound in a second concentration (C2);
heating the gaseous mixture until the molecules of the first and second compounds dissociate and keeping said
(Continued)

article in the reactive atmosphere thereby created to obtain diffusion of the carbon and nitrogen atoms in the external surface (2) of said article and to form stoichiometric carbonitride ($ZrC_x$—$N_y$) at the surface, and prior to the step of heating the process gases contained in the chamber, a reduction step consisting in placing said article inside a chamber into which dihydrogen is injected and in heating the dihydrogen allowing diffusion towards the surface and release of the oxygen contained in said zirconia article.

14 Claims, 1 Drawing Sheet

(51) Int. Cl.
  C04B 41/00    (2006.01)
  G04B 37/22    (2006.01)
  C23C 8/30     (2006.01)
  G04B 45/00    (2006.01)

(52) U.S. Cl.
  CPC .............. *C23C 8/30* (2013.01); *G04B 37/225* (2013.01); *G04B 45/0076* (2013.01)

(56) References Cited

FOREIGN PATENT DOCUMENTS

CN    1325833 A      12/2001
SE     455195 B  *   6/1988

OTHER PUBLICATIONS

Watanabe, T. et al., "Synthesis of Fine Zirconium Nitride Powders by Floating-Type Reduction-Nitridation of Zirconia Powder," Journal of The Australian Ceramic Society, vol. 36, No. 2, Jan. 2000, pp. 121-125.

Combined Chinese Office Action and Search Report dated Feb. 5, 2021 in Chinese Patent Application No. 201780050634.X (with English translation), citing documents AA and AO-AQ therein, 13 pages.

* cited by examiner

METHOD FOR OBTAINING A CARBONITRIDED ZIRCONIA-BASED ARTICLE

The present invention concerns a zirconia-based article, especially a sintered article, and in particular one whose chemical structure is transformed on part of its thickness to give the article an external surface having a metallic appearance and non-zero electrical conductivity. The invention also concerns a use of such an article as an external element of an article such as a wristwatch, a piece of jewellery or any other article for the luxury industry that may use this type of product, in particular for making structural elements of watch cases or bracelets. The present invention finally concerns a method for obtaining such an article.

PRIOR ART

Among all known materials, metals are very widely used because of certain very advantageous properties: high mechanical resistance, high tenacity, electrical conductivity, etc. Further, their characteristic lustre is very sought after for decorative applications. The hardness of metals is, however, lower than that of ceramics, which may result in significant wear and corrosion in numerous common conditions of use, for example, when these materials are used to make external timepiece elements, such as watch cases or wristbands.

There are known methods for shaping and polishing ceramics to obtain external elements whose hardness and resistance to wear and to corrosion are considerably higher than those of metals.

There is a known method for modifying a zirconia-based ceramic ($ZrO_2$) part of this type in order to give it metallic properties, including a grey colour and brilliance close to that of platinum and non-zero surface conductivity, while maintaining a higher hardness and resistance to wear and to corrosion than that of metals. This method makes it possible to obtain a finished or semi-finished zirconia article having a partially reduced $ZrO_2$ core and a metallic external appearance. It includes the steps consisting of:

taking at least one zirconia article, pre-shaped in its finished or semi-finished form;

placing said article inside a chamber in which a plasma is created from a mixture of hydrogen, a neutral gas, and traces of carbon, and maintaining said article near to the plasma for a time period of around 15 to 240 minutes, the mean temperature of the article settling in these conditions between around 600 and 1,300° C., to obtain a diffusion of carbon atoms in said article.

Such a method therefore makes it possible to produce a zirconia part having an outer layer of zirconium carbide ZrC with a metallic appearance and properties, i.e. a brilliant and conductive surface, while keeping its advantageous properties in comparison to a metal part.

Thus, advantageously in comparison to deposition methods for thin decorative films of metallic appearance by PVD or CVD or other deposition methods, the external layer of metallic appearance produced by this carbiding method is integral with the core of the part, resulting in perfect adhesion of the layer with no risk of delamination.

Finally, this method makes it possible to obtain finished or semi-finished parts with the advantageous properties of zirconium carbide ZrC on the surface without having to produce solid ZrC parts, which would require high temperature sintering methods, possibly under pressure. Also, ZrC is more than 10% denser than $ZrO_2$, so that $ZrO_2$ parts carbided by the aforementioned method are lighter than parts of the same geometry made of solid ZrC. Finally, since ZrC is much harder (typically 25 GPa) than $ZrO_2$ (typically 13 GPa), solid ZrC parts would be much harder to machine and polish after sintering than the same parts made of $ZrO_2$. The aforementioned method overcomes this problem by making it possible to postpone transformation of the surface of the ZrC part until after the machining and polishing of the $ZrO_2$ part.

This method can be adapted to obtain a layer of zirconium nitride that also has a metallic appearance, non-zero conductivity and perfect adhesion, but is yellow in colour, close to gold. To achieve this, the plasma is obtained from a mixture of hydrogen, a neutral gas and traces of nitrogen.

However, it is noted that the possible colour spectrum for these carbiding/nitriding methods is quite limited. Indeed, carbiding makes it possible to obtain a metallic effect with a typical platinum colour while nitriding gives a metal effect with a typical gold colour. There is, however, a need to increase the level of customization of articles such as telephones or watches or jewellery and this customization involves increasing the colours available.

SUMMARY OF THE INVENTION

It is an object of the invention to overcome the drawbacks of the prior art by providing a method for obtaining a zirconia article that allows the formation of layers of zirconium carbonitride on its surface thickness with the same aesthetic, electrical, and mechanical and chemical resistance properties as layers obtained by a plasma method, but with a colour spectrum ranging from platinum for pure carbiding to gold for pure nitriding, and including bronze and rose gold, depending on the relative stoichiometry (or concentration) of carbon C and nitrogen N that has diffused in the zirconia, said relative stoichiometry depending in turn on the relative carbon and nitrogen concentration in the atmosphere of the chamber.

To this end, the invention concerns a method for obtaining a finished or semi-finished zirconia-based article, the article having a metallic external appearance and non-zero surface electrical conductivity, characterized in that it includes the steps consisting in:

taking at least one zirconia article, pre-shaped in its finished or semi-finished form;

placing said article inside a chamber into which a gaseous mixture is injected, this gaseous mixture including at least a first hydrogen and carbon based gas compound in a first concentration and a second hydrogen and nitrogen based gas compound in a second concentration, and heating said gaseous mixture until the molecules of the first and second compounds dissociate and keeping said article inside the chamber containing the heated gases to heat the article also and obtain diffusion of carbon and nitrogen atoms in the external surface of said article.

The method according to the invention advantageously makes it possible to provide another colour option for colouring a ceramic element, and this colour can be adjusted according to the concentration of the first compound and of the second compound in the gaseous mixture.

In a first advantageous embodiment, the gaseous mixture is heated, and its molecules are dissociated by at least one resistive element made from refractory metal traversed by an electric current and placed inside the chamber so as to heat the gaseous mixture and the articles to be treated in a homogeneous manner.

In a second advantageous embodiment, the gaseous mixture is heated, and its molecules are dissociated by a plasma produced in the chamber so as to heat the gaseous mixture and the articles to be treated in a homogeneous manner.

BRIEF DESCRIPTION OF THE DRAWINGS

The objects, advantages and features of the device according to the present invention will appear more clearly in the following detailed description of at least one embodiment of the invention, given solely by way of non-limiting example and illustrated by the annexed drawings, in which.

DETAILED DESCRIPTION

Figure 1:
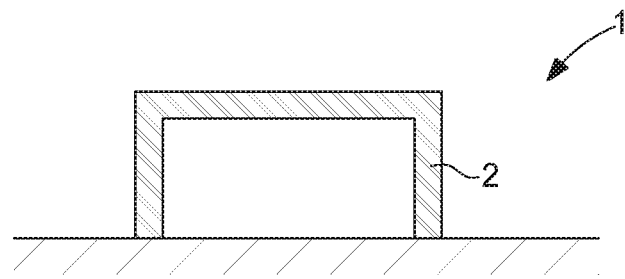
FIG. 1 schematically represents the article according to the invention.

By way of example in FIG. 1, there is provided a starting object formed by a zirconia article 1 having a tetragonal crystallographic configuration (zirconium oxide, $ZrO_2$), for example, which is white in colour and made by normal ceramic article manufacturing techniques, for example by sintering.

This article may be a finished product having the final shape in which it will be used, for example a part of generally parallelepiped shape which has already been mirror polished and is intended to form an external element of a watch, for example a watchband link. Of course, if required, the article may be a semi-finished product on which subsequent machining operations could be performed to adapt the article to its final use. Article 1 could be a part of a watch or of a piece of jewellery or of any article related to the luxury industry that may use this type of external element.

Figure 2:
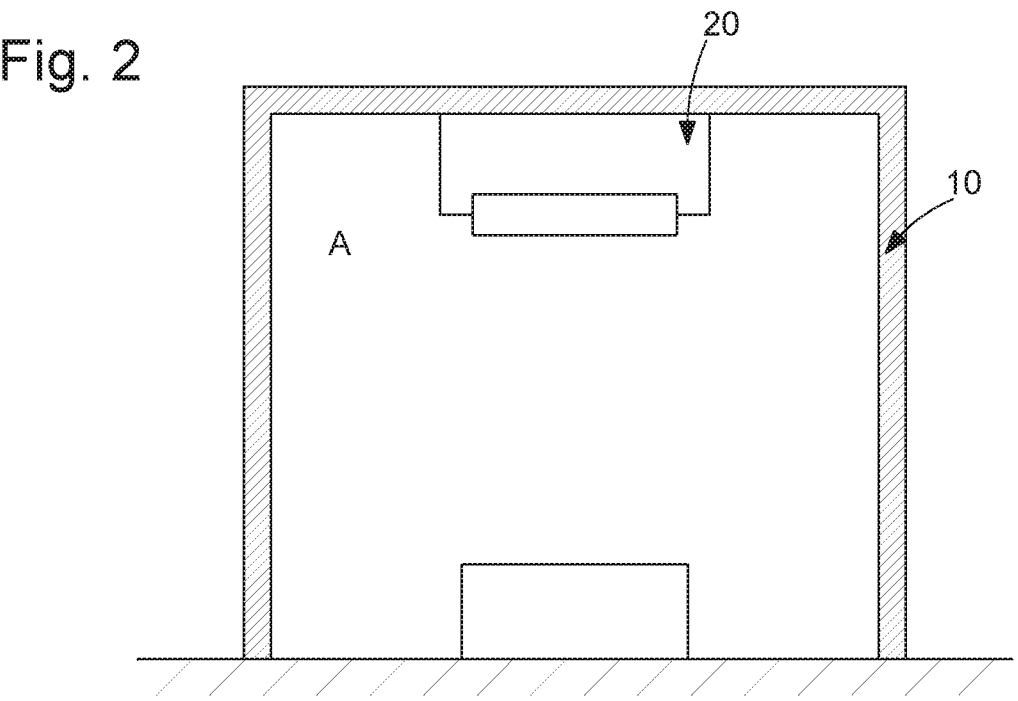
FIG. 2 schematically represents the chamber for performing the method according to the invention.

This article is then introduced into a chamber 10 inside which it will be treated as seen in FIG. 2. The treatment that will be applied is a simultaneous carbiding and nitriding treatment, also known as carbonitriding. An essential feature of the method is that it involves a transformation of the surface of the article over a small thickness, on the order of 10 to 1,000 nm, wherein the zirconia (zirconium oxide) in the outer area 2 seen in FIG. 1 is transformed into zirconium-carbonitride $ZrC_xN_y$ with a metallic appearance. There is therefore a surface modification of the zirconia structure into a new crystallographic structure corresponding to that of a zirconium carbonitride and not an added coating that is susceptible to being torn off or detaching from the surface of the article, particularly when the latter is subjected to high wear conditions. More particularly, the outer area of the surface layer, which has the zirconium-carbonitride structure, extends from the surface to a depth comprised between 20 and 200 nm.

In order to perform a carbonitriding treatment, chamber 10 must contain a gas-filled atmosphere A containing hydrogen, carbon and nitrogen, and be provided with heating means 20, these heating means making it possible to activate the treatment.

According to the invention, the chamber contains a gaseous mixture including at least a first compound and a second compound. The first compound is a hydrogen and carbon-based gas of the $CH_4$ type in a first concentration C1 in said chamber. The second compound is a hydrogen and nitrogen-based gas of the $NH_3$ type in a second concentration C2 in the chamber.

The temperature increase inside the chamber allows treatment of the zirconia article to occur. Indeed, this temperature increase in the atmosphere inside the chamber causes dissociation of the gases, so that the atoms of hydrogen H, of carbon C and of nitrogen N are free, and an increase in the temperature of the zirconia part. Under the combined effect of heat and hydrogen atmosphere, part of the oxygen contained in the zirconia diffuses towards the surface and is released from the zirconia.

This partial zirconia reduction by diffusion of part of its oxygen towards its surface is concomitant with diffusion of carbon and nitrogen atoms from the surface towards the core of the article. Indeed, under the effect of heat, the carbon and nitrogen atoms dissociated from the gaseous mixture of the chamber will diffuse in the partially reduced zirconia. This diffusion of carbon and nitrogen atoms causes the appearance of a surface layer of these atoms recombined with the partially reduced zirconia to produce a layer of zirconium carbonitride.

According to a feature of the article according to the invention, the surface layer includes a transition area located between the partially reduced zirconia core and the outer carbided and nitrided treated (carbonitrided) area. Indeed, given that the gaseous mixture of the atmosphere includes a first carbon based compound and a second nitrogen based compound, the article is simultaneously carbided and nitrided and the transition area simultaneously contains zirconium oxycarbides and oxynitrides. It is therefore noted that the chemical composition of the surface layer varies as a function of depth measured from the surface of the external element and changes continuously from stoichiometric zirconium-carbonitride ($ZrC_x$—$N_y$) at the surface to a transition area including zirconium oxycarbides and oxynitrides, and then finally to the core of the sub-stoichiometric zirconium oxide (partially reduced zirconia) part.

According to another preferred feature of the invention, the carbon-nitrogen content of the zirconium oxycarbides and oxynitrides in the transition area decreases with depth, while their oxygen content increases with depth. The transition area thus includes zirconium oxycarbides/oxynitrides whose carbon/nitrogen content gradually decreases towards the core of the article, while the presence of oxygen gradually increases in the form of $ZrO_zC_x$—$ZrO_zN_y$ type compounds, to gradually reach the core of the article which is essentially formed of partially reduced $ZrO_{2-x}$ zirconia. It will of course be understood that the transition between these various areas occurs gradually.

Naturally, the degree of carbiding/nitriding of the article will depend on the concentrations of the first compound and of the second compound in the gaseous mixture injected into the chamber. Indeed, the latter are not necessarily identical so that, depending on the ratio existing between the concentration of the first compound and the concentration of the second compound in the gaseous mixture, the article will be more carbided than nitrided or vice versa. This mixture of carbiding and nitriding allows said article to have an unusual external colour resulting from the mixture between the platinum colour from carbiding and the gold colour from nitriding. The colour spectrum obtained will thus range from platinum colour to yellow gold and includes bronze and rose gold. The final colour thus depends on the initial concentration of the first and second compounds, so that the higher the concentration C1 of carbon based compound relative to the concentration C2 of nitrogen based compound, the more the final colour of the part will tend towards bronze or platinum. Conversely, the higher the concentration C2 of nitrogen based compound relative to the concentration C1 of carbon based compound, the more the final colour of the part will tend towards rose gold or yellow gold. Preferably, concentration C1 is comprised between 5 and 100 sccm (standard cubic centimetre per minute) while concentration C2 is comprised between 250 and 5000 sccm.

Articles obtained by this method acquire some novel properties, particularly non-zero surface electrical conductivity, a colour close to bronze or rose gold and a metallic shine, while maintaining the properties of ceramics, in particular their very high hardness and resistance to wear and corrosion.

In a first embodiment, the heating means for activating the treatment include at least one resistive element made from refractory metal. Such a resistive element uses an electrical current traversing it to produce heat by Joule effect. Heating means 20 may thus comprise a single resistive element 21, arranged inside said chamber for heating the gases and parts to be treated in a homogeneous manner, or a plurality of independent resistive elements arranged to ensure a homogeneous distribution of heat.

In a second embodiment, the heating means are a plasma. Such a plasma is obtained from ionization of the hydrogen, carbon and nitrogen based gaseous mixture and where appropriate a neutral gas. This plasma is obtained for example by means of an electrical discharge. Evidently, according to variants of the method of the invention, other means for producing plasma can be envisaged. By way of example, the plasma can be obtained by radiofrequency waves (RF) or by microwaves.

Depending on the method used to obtain the plasma, the use of argon as neutral gas is advantageous. Evidently, the use of other neutral gases, such as neon, can be envisaged.

In a variant, a preliminary zirconia reduction step may be provided. This reduction step is performed before the carbonitriding step and consists in placing said article in a chamber into which dihydrogen $H_2$ is injected. The atmosphere in the chamber is heated so that the article exhibits a temperature increase causing a diffusion to the surface and release of the oxygen contained in the zirconia.

This reduction step can be performed in a specific chamber or in the same chamber as the carbonitriding operation. In that case, the chamber includes means for modifying the nature of the atmosphere inside said chamber.

It will be clear that various modifications and/or improvements and/or combinations evident to those skilled in the art may be made to the various embodiments of the invention set out above without departing from the scope of the invention defined by the annexed claims.

The invention claimed is:

1. A method for obtaining a finished or semi-finished zirconia-based article that has a metallic external appearance and a non-zero surface electrical conductivity, the method comprising:
 placing at least one zirconia article, pre-shaped in its finished or semi-finished form, inside a first chamber comprising a gaseous mixture comprising a first gas compound in a first concentration (C1) and a second gas compound in a second concentration (C2),
 wherein:
 the at least one zirconia article comprises zirconium oxide; and
 the first gas compound comprises hydrogen and carbon atoms and the second gas compound comprises hydrogen and nitrogen atoms:
  heating the gaseous mixture until molecules of the first and the second gas compounds dissociate to obtain a reactive atmosphere comprising carbon and nitrogen atoms, and
  keeping the at least one zirconia article in the reactive atmosphere to obtain diffusion of the carbon and nitrogen atoms in an external surface of the at least one zirconia article, thereby forming a transformed layer comprising stoichiometric carbonitride ($ZrC_x$—$N_y$) at the external surface,
  wherein prior to the heating of the gaseous mixture, the at least one zirconia article is placed inside a second chamber comprising dihydrogen, and the dihydrogen is heated to obtain diffusion of oxygen of the zirconium oxide comprised by the at least one zirconia article towards the external surface, and thereby release of the oxygen.

2. The method of claim 1, wherein the heating of the gaseous mixture further comprises diffusion of oxygen of the zirconium oxide comprised by the at least one zirconia article towards the external surface, and thereby release of the oxygen.

3. The method of claim 1, wherein a thickness of the transformed layer at the external surface of the at least one zirconia article is between 10 and 1,000 nm.

4. The method of claim 3, wherein the thickness is between 20 and 200 nm.

5. The method of claim 1, wherein C2 is greater than C1.

6. The method of claim 1, wherein C1 is between 5 and 100 sccm.

7. The method of claim 1, wherein C2 is between 250 and 5000 sccm.

8. The method of claim 1, wherein the first gas compound consists of hydrogen and carbon atoms.

9. The method of claim 1, wherein the second gas compound consists of hydrogen and nitrogen atoms.

10. The method of claim 1, wherein the first gas compound is $CH_4$.

11. The method of claim 1, wherein the second gas compound is $NH_3$.

12. The method of claim 1, wherein the heating of the gaseous mixture is provided by a resistive element.

13. The method of claim 1, wherein the heating of the gaseous mixture is performed via plasma generation.

14. The method of claim 13, wherein the plasma generation is achieved by electrical discharges, radiofrequency waves, and/or microwaves.

* * * * *